UNITED STATES PATENT OFFICE.

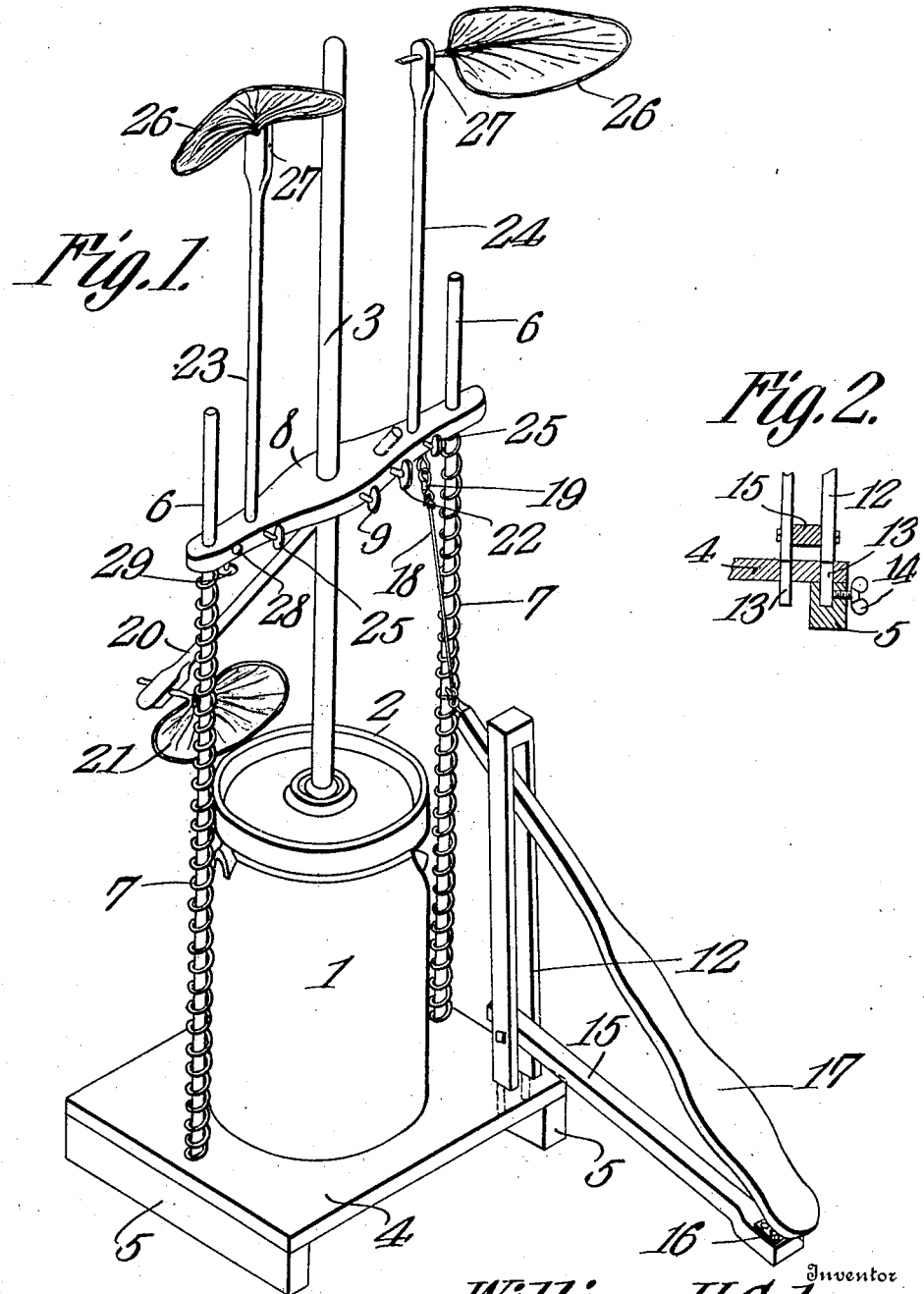

WILLIAM H. COLMAN, OF PADUCAH, KENTUCKY.

CHURN-OPERATING MECHANISM.

No. 918,508.　　　　Specification of Letters Patent.　　　Patented April 20, 1909.

Application filed March 23, 1908.　Serial No. 422,739.

*To all whom it may concern:*

Be it known that I, WILLIAM H. COLMAN, a citizen of the United States, residing at Paducah, in the county of McCracken and State of Kentucky, have invented a new and useful Churn-Operating Mechanism, of which the following is a specification.

This invention relates to a mechanism for operating churns and other devices requiring a vertically reciprocating motion; and has for its object to provide a simple, strong and economical structure for imparting such motion to a churn dasher rod; movement in one direction being produced by manual or pedal action and in the opposite direction by resilient means.

A further object of the invention relates to means applied to the movable portion of the mechanism for keeping insects away from the mouth of the churn, when the device is applied thereto, and further means attached to the same part of the mechanism for operating one or more fans to cool the person operating the churn when the weather is warm.

With these and other objects in view the invention consists of certain novel combination construction and arrangement of parts hereinafter described and claimed, and illustrated in the accompanying drawing in which—

Figure 1 represents a perspective view of the operating mechanism applied to a reciprocating churn, and Fig. 2 a detail of construction.

The churn body 1 has a cover 2 through the center of which is a hole for the passage of a rod 3 attached to a dasher—not shown—within the body. This old and well known type of churn is supported on a base board 4 upheld from the floor by two parallel cross strips 5 at opposite ends of the base boards to give greater steadiness thereto. Fixed to the base boards 4 are two vertically disposed guide bars or rods 6 between which the churn is placed and which project above the same to a suitable height for the purpose required. Surrounding each guide bar or rod is a coiled spring 7 their lower ends resting on the base board and their upper ends supporting a cross head 8 having a vertical opening through each end for the guide rods 6 to pass through and a similar opening in the center for the dasher rod 3 which latter rod is fixed in adjusted position by a thumb screw 9 or other suitable means.

If the thumb screw 9 be loosened the dasher and cover 2 may be removed from the churn and cream or milk placed in the body 1. Returning the dasher and cover to place, the former is adjusted to the highest position required and secured by the thumb screw 9 bearing against the dasher rod 3. Now, by pressing on the cross head 8 or dasher rod 3, the dasher is forced downward through the cream or milk to or near the bottom of the churn agitating the cream or milk and compressing the springs 7. When pressure is removed from the mechanism the compressed springs restore the parts to their initial position. It will thus be seen that by a succession of such operations, manual power being applied only on the downward stroke of the dasher, butter will be rapidly and easily made with slight expenditure of power on the part of the person operating the mechanism.

Manual operation of the mechanism may be assisted or replaced by a pedal attachment such as that shown in the drawing which comprises a vertical standard or guide frame 12 formed preferably of two upright parallel bars rigidly connected together at the top and supported on one corner of the base board 4 by inserting their reduced lower ends into sockets 13 made in the base and fastening the standard in position by a thumb screw 14 or other convenient means. Pivotally attached to the bottom of the standard 12 between the parallel bars thereof is an arm 15 projecting outwardly from the base board when in use, its free end resting on the floor. Fulcrumed to the outer end of the arm 15 by a hinge 16 is a pedal lever 17 its free end extending through the standard or guide frame 12 toward the churn where it is fastened to a cord, chain or other connection 18 reaching upwardly to the cross head 8. For the sake of illustration, the drawing shows a cord tied to the inner end of the pedal with a snap hook 19 on its other end engaging an eye on the under side of the cross head. By applying pressure to the pedal the mechanism operates in the same manner as when the hand is used.

To prevent flies and other insects from collecting around the mouth of the churn, a rod 20 is fitted in an opening in the cross head 8 and extends downwardly at an angle thereto beyond the churn and carries on its lower end a fan 21 of any approved form directed toward the churn at the most effective angle. A thumb screw 22 holds the rod 20 in the cross head. The operation of the mechanism raises and lowers the fan, creating a current of air of sufficient force to drive insects, especially flies, away from the churn.

The numerals 23 and 24 indicate two vertically disposed rods fitting adjustably in apertures in the cross head 8 and held fixed therein by thumb screws 25. These rods extend sufficiently high to be above the head of a person operating the churn when the mechanism is in its lowest position. The upper ends of the rods 23 and 24 are preferably enlarged for the attachment to each of a fan 26 which may be an ordinary palm leaf fan or a fan constructed especially for the purpose. The fans project from the rods over the head of the person at the churn and when the mechanism is operated they produce a cooling effect as they rise and fall. Additional fans may be placed in the upper ends of the rods 23 and 24 in holes 27 at right angles to the holes supporting the fans 26. In the side of the cross head a hole 28 is made for a fan, its handle being secured by a thumb screw 29. As thus constructed and arranged the fans may be changed or adjusted to any position desired and placed at the most effective angles, for cooling the operator.

Having described my invention, what I claim as new and desire to secure by Letters Patent is:

1. A churn operating mechanism comprising a base board for supporting a churn, spaced vertical guide bars or rods rising from said base board, a coiled spring loosely surrounding each guide bar or rod and resting on the platform, a cross head supported on the upper ends of said springs and having end perforations for sliding on said guide bars or rods, an inclined socket in said cross head for a slidable rod having an adjustable fan on its lower end and a thumb screw for fastening said inclined rod to the cross head the latter having an aperture for the adjustable churn dasher rod and means for fastening the cross head to said rod.

2. A churn operating mechanism comprising a base board for supporting a churn, spaced vertical guide bars or rods firmly seated in said base, a coiled spring loosely surrounding each of said guide bars or rods, a cross head seated on the upper ends of said springs and having a central opening in which a churn dasher rod may be adjustably mounted, and end perforations for said vertical guide bars or rods to freely pass through, means for securing the dasher rod to the cross head, a removable standard or guide frame on said base, a folding arm pivoted to said standard, a pedal hinged to the outer end of said arm and extending through said standard or guide frame, and a connection between said pedal and said cross head.

In testimony that I claim the foregoing as my own, I have hereto affixed my signature in the presence of two witnesses.

WILLIAM H. COLMAN.

Witnesses:
W. G. McFADDEN,
JNO. W. OGILVIE.